Figure 1:
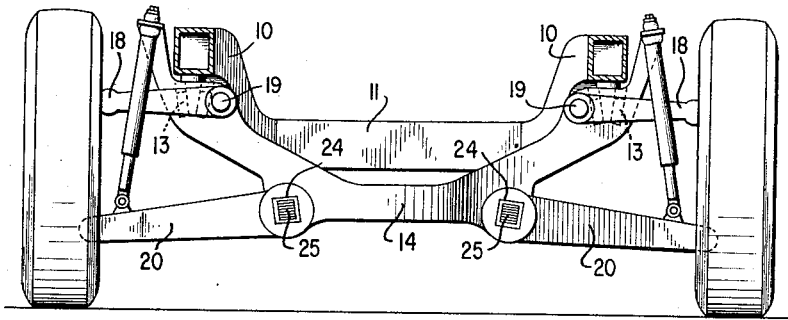

Dec. 15, 1964   L. KRAUS   3,161,251
WHEEL SUSPENSION FOR VEHICLES
Filed June 8, 1961

INVENTOR.
LUDWIG KRAUS

BY
*Dicke, Cray & Freudenberg*
ATTORNEYS.

United States Patent Office 3,161,251
Patented Dec. 15, 1964

3,161,251
WHEEL SUSPENSION FOR VEHICLES
Ludwig Kraus, Stuttgart-Sillenbuch, Germany, assignor to Daimler-Benz Aktiengesellschaft, Stuttgart-Unterturkheim, Germany
Filed June 8, 1961, Ser. No. 115,801
Claims priority, application Germany June 11, 1960
4 Claims. (Cl. 180—64)

The present invention relates to a wheel-suspension- and-wheel-spring-system for vehicles, especially for motor vehicles, by means of transverse guide members at an auxiliary frame, and essentially consists in operatively connecting at least one of the transverse guide members with a torsion spring accommodated within a hollow longitudinal bearer member of the auxiliary frame.

As a result of such a construction, a triple function is ascribed to the hollow bearer member in a weight-and-space-saving manner: (a) the longitudinal bearer member is an integral component part of the auxiliary frame and as such carries out its supporting and bracing functions such as, for example, accommodation of the pivotal suspension of the wheels, support of the engine, bracing of the braking moments, etc.; (b) moreover, the longitudinal bearer receives the torsion spring whereby the latter is protected and furthermore does not require any additional space; and (c) the hollow bearer member serves the purpose of supporting and transmitting the spring moment.

A particularly simple but nevertheless sturdy and stable construction results if the auxiliary frame is provided with a cross bearer member extending approximately within a vehicle transverse plane passing approximately through the wheel axes and with two tubularly-shaped longitudinal bearer members each accommodating one torsion spring and extending essentially in the longitudinal direction of the vehicle. The engine or engine-transmission block may be supported thereby exclusively on the auxiliary frame. In many cases, however, it is preferable if the tubularly-shaped longitudinal bearer member extends from the cross bearer member of the auxiliary frame toward the respective vehicle end, i.e., with the front axle toward the front of the vehicle. An extension in the opposite direction could possibly reduce the space for the passengers or for the load.

In order to obtain the relatively soft spring characteristics required in modern motor vehicles, the usual torsion rod springs have to be constructed of relatively great length. In order that the hollow bearer member of the auxiliary frame does not have to be constructed for that reason of excessive length, it is proposed according to another feature of the present invention to construct the torsion spring as a leaf-spring package. Such springs produce with the same load, though of shorter structural length, the same torsional deflection as torsion rod springs.

A particularly simple construction thereby essentially consists, if in accordance with the present invention, the transverse guide member which is operatively connected with the torsion spring, preferably the lower of a double transverse guide member arrangement, is connected directly with one end of the torsion spring and is supported within the hollow bearer member of the auxiliary frame.

It is thereby advantageous in the interest of a light-weight construction if the guide member connected with the torsion spring consists of an arm member extending essentially in the vehicle transverse direction and of a second arm member, preferably constructed as rod, which extends from the free end of the first arm member obliquely toward a bearing place arranged at the hollow bearer member.

Accordingly, it is an object of the present invention to provide a wheel suspension for vehicles utilizing an auxiliary frame in which the auxiliary frame is capable of assuming its intended function in a more effective manner.

It is another object of the present invention to provide a wheel suspension for suspending the wheels from an auxiliary frame which not only consists of an essentially transversely extending auxiliary frame member but which also includes longitudinal hollow bearer members capable of assuming triple functions.

Still another object of the present invention resides in the provision of an auxiliary frame construction consisting of a transverse frame member and of two longitudinal hollow bearer members which do not substantially increase the weight or space requirements for the auxiliary frame.

Still another object of the present invention resides in the provision of a wheel spring suspension for suspending and spring supporting the wheels from an auxiliary frame in which hollow longitudinal bearer members are provided on the auxiliary frame for accommodating therein relatively short torsion springs capable of producing a relatively soft spring suspension for the vehicle notwithstanding the relatively short dimensions thereof.

A further object of the present invention resides in the provision of an auxiliary frame consisting of a transverse bearer member and of two longitudinal hollow bearer members which not only are capable to accommodate therewithin the torsion springs of the wheel suspension but which together with the transverse bearer member are capable to support thereon the entire drive unit including engine and transmission block.

A further object of the present invention resides in the provision of a spring wheel suspension for the wheels of a motor vehicle in which an auxiliary frame and torsion springs are used and which is of very simple and relatively small dimension.

These and other objects, features and advantages of the present invention will become more obvious from the following description when taken in connection with the accompanying drawing which shows, for purposes of illustration only, one embodiment in accordance with the present invention, and wherein FIGURE 1 is a front elevational cross sectional view of a wheel suspension in accordance with the present invention, the cross section being taken behind the auxiliary frame in the direction looking toward the front end of the vehicle.

Figure 2:
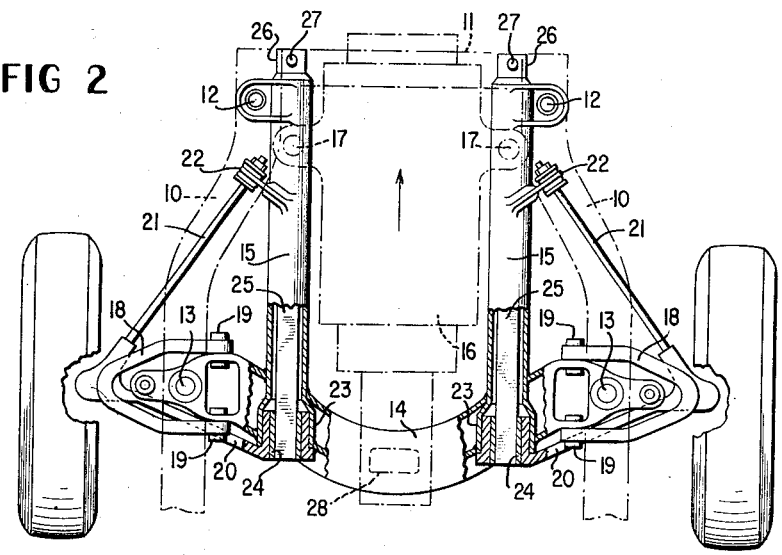
Figure 3:
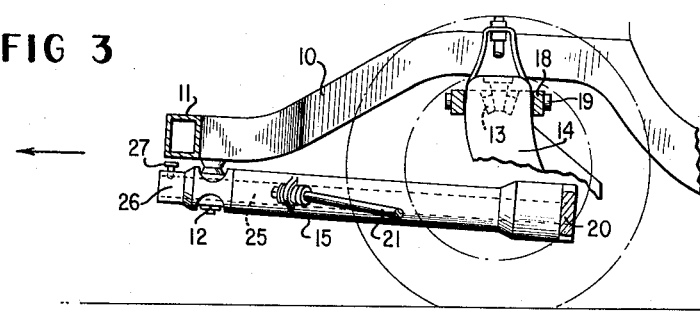

FIGURE 2 is a top plan view of the wheel suspension illustrated in FIGURE 1, with certain parts thereof shown in cross section to illustrate the details thereof, and FIGURE 3 is a partial cross sectional side elevational view of the wheel suspension illustrated in FIGURES 1 and 2.

Referring now to the drawing wherein like reference numerals are used throughout the various views to designate corresponding parts, reference numeral 10 designates therein the longitudinal frame bearer members of the vehicle which extend in the longitudinal direction of the vehicle substantially along the two sides thereof. The longitudinal bearer members 10 are upwardly offset in the area over the front axle (FIGURE 3) and converge toward each other in the forward direction of the vehicle (FIGURE 2). The longitudinal bearer members 10 are reinforced along the front ends thereof by a cross bearer member 11 suitably connected thereto. The auxiliary frame consisting of a transverse bearer member 14 and of two hollow longitudinal bearer members 15 is secured at the two bearing places 12 and 13 on the main frame by means of suitable rubber bearings of any known conventional construction. As indicated in FIGURE 2, the engine transmission block 16 is supported on the auxiliary frame at the bearing places 17 and 28, also by the interposition of suitable rubber bearings.

The wheels are guided with the air of double transverse guide members. The upper triangular guide members 18 are thereby pivotally secured at 19 on the transverse bearer member 14 of the auxiliary frame. The lower transverse guide members consist of arm members 20 extending approximately in the vehicle transverse direction and of rods 21 extending obliquely to the normal direction of travel of the vehicle. The rods 21 are retained at points 22 within rubber bearings secured at the hollow bearer members 15. The lower guide members 20 are pivotally secured within the enlarged end portions 23 of respective hollow longitudinal bearer members 15. The hub portion of each transverse guide member 20 accommodates a four-cornered or square tubular member 24 within which is retained a leaf-spring package 25. The leaf spring assembly 25 extends over the entire length of the hollow bearer member 15 and is non-rotatably secured at the other end thereof at point 26 within a four-cornered aperture thereof. An adjusting screw 27 assures that the spring 25 will not undergo any displacements in the longitudinal direction.

While I have shown and described one embodiment of a wheel suspension in accordance with the present invention, it is obvious that the same is not limited thereto. For example, a torsion thrust spring, i.e., a spring subjected to shearing forces and of any suitable construction may be accommodated within the hollow longitudinal bearer member of the auxiliary frame or any other suitable torsion spring of equivalent construction and function. A conventional type of torsional shearing or thrust spring is an arrangement, for example, in which a rod which is subjected to rotation during spring movements of the lower guide arm 20, in an analogous manner with that of the torsion leaf spring package 25, is securely bonded, for instance, by vulcanization with an elastic bushing or sleeve which, in turn, itself is securely bonded, again for instance, by vulcanization with an outer stationary sleeve member so that during rotation of the inner rod with respect to the outer sleeve the elastic rubber bushing is subjected to shearing stresses in the tangential direction thereof. Additionally, the present invention may be used to great advantage if the wheels suspended at the auxiliary frame are driven wheels since no coil springs are in the path of the drive shafts.

Since the present invention is equally applicable to vehicles having a separate frame as well as to vehicles of the self-supporting body-type, the broad term of vehicle superstructure is used herein to describe the relatively fixed part of the vehicle on which the auxiliary frame is elastically supported.

Thus, it is obvious that the present invention is not limited to the details shown and described herein but is susceptible of many changes and modifications within the spirit and scope thereof and I, therefore, do not wish to be limited to the details shown and described herein but intend to cover all such changes and modifications as are encompassed by the scope of the appended claims.

I claim:

1. A front wheel suspension and spring system for a motor vehicle having a vehicle superstructure, steered front wheels, and a drive unit, comprising auxiliary frame means for supporting said steered front wheels and said drive unit including a substantially transversely extending frame member and two hollow tubular bearer members extending longitudinally of the vehicle and toward the front thereof from said transversely extending frame member, first means for elastically supporting said auxiliary frame means on said vehicle superstructure, second means for elastically supporting said drive unit exclusively on said auxiliary frame means, said transversely extending frame member being disposed approximately in a vertical plane extending transversely of the vehicle and including the wheel axes, two torsion springs in the form of leaf-spring packages one each arranged within a respective hollow longitudinal bearer member, and transverse guide means including upper and lower guide members for each wheel, the lower guide member for each wheel being directly connected with a respective end of a torsion spring and being supported within a respective tubular bearer member, and said lower guide member each being composed of an arm member extending approximately transversely of said vehicle and of a rod extending toward the front of said vehicle obliquely to the vehicle longitudinal direction, each of said rods being elastically secured at the forward end thereof to a respective hollow bearer member.

2. A front wheel suspension and spring system for a motor vehicle having a vehicle superstructure, steered front wheels, and a drive unit, comprising auxiliary frame means for supporting said steered front wheels and said drive unit including a substantially transversely extending frame member and two hollow tubular bearer members extending longitudinally of the vehicle and toward the front thereof from said transversely extending frame member, first means for elastically supporting said auxiliary frame means on said vehicle superstructure including an elastic bearing at the front end of each said tubular bearer member and an elastic bearing adjacent each end of said transversely extending frame member, second means for elastically supporting said drive unit exclusively on said auxiliary frame means, said transversely extending frame member being disposed approximately in a vertical plane extending transversely of the vehicle and including the wheel axes, two torsion springs in the form of leaf-spring packages one each arranged within a respective hollow longitudinal bearer member, and transverse guide means including upper and lower guide members for each wheel, the lower guide member for each wheel being directly connected with a respective end of a torsion spring and being supported within a respective tubular bearer member, and said lower guide member each being composed of an arm member extending approximately transversely of said vehicle and of a rod extending toward the front of said vehicle obliquely to the vehicle longitudinal direction, each of said rods being elastically secured at the forward end thereof to a respective hollow bearer member.

3. A front wheel suspension and spring system for a motor vehicle having a vehicle superstructure, steered front wheels, and a drive unit, comprising auxiliary frame means for supporting said steered front wheels and said drive unit including a substantially transversely extending frame member and two hollow tubular bearer members extending longitudinally of the vehicle and toward the front thereof from said transversely extending frame member, first means for elastically supporting said auxiliary frame means on said vehicle superstructure, said transversely extending frame member being disposed approximately in a vertical plane extending transversely of the vehicle and including the wheel axes, two torsion springs in the form of leaf-spring packages one each arranged within a respective hollow longitudinal bearer member, and transverse guide means including upper and lower guide members for each wheel, the lower guide member for each wheel being directly connected with a respective end of a torsion spring and being supported within a respective tubular bearer member, and said lower guide member each being composed of an arm member extending approximately transversely of said vehicle and of a rod extending toward the front of said vehicle obliquely to the vehicle longitudinal direction, each of said rods being elastically secured at the forward end thereof to a respective hollow bearer member.

4. A front wheel suspension and spring system for a motor vehicle having a vehicle superstructure, steered front wheels, and a drive unit, comprising auxiliary frame means for supporting said steered front wheels and said drive unit including a substantially transversely extending frame member and two hollow tubular bearer members extending longitudinally of the vehicle and toward the front end thereof from said transversely extending frame member, first means for elastically supporting said auxiliary frame means on said vehicle superstructure, second means for elastically supporting said drive unit exclusively on said auxiliary frame means, said transversely extending frame member being disposed approximately in a vertical plane extending transversely of the vehicle and including the wheel axes, two torsion springs on each arranged within a respective hollow longitudinal bearer member, and transverse guide means including upper and lower guide members for each wheel, the lower guide member for each wheel being directly connected with a respective end of a torsion spring and being supported within a respective tubular bearer member, and said lower guide member each being composed of an arm member extending approximately transversely of said vehicle and of a rod extending toward the front of said vehicle obliquely to the vehicle longitudinal direction, each of said rods being elastically secured at the forward end thereof to a respective hollow bearer member.

References Cited in the file of this patent

UNITED STATES PATENTS

| | | |
|---|---|---|
| 1,789,971 | Ford | Jan. 27, 1931 |
| 2,708,003 | Nallinger | May 10, 1955 |
| 2,998,241 | Eyb | Aug. 29, 1961 |

FOREIGN PATENTS

| | | |
|---|---|---|
| 296,215 | Switzerland | Apr. 1, 1954 |